(12) United States Patent
Oteri et al.

(10) Patent No.: US 12,389,411 B2
(45) Date of Patent: Aug. 12, 2025

(54) SYSTEMS AND METHODS FOR MULTI-PxSCH SCHEDULING IN UNLICENSED CHANNELS

(71) Applicant: Apple Inc., Cupertino, CA (US)

(72) Inventors: Oghenekome Oteri, San Diego, CA (US); Hong He, Cupertino, CA (US); Huaning Niu, San Jose, CA (US); Wei Zeng, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 17/724,848

(22) Filed: Apr. 20, 2022

(65) Prior Publication Data

US 2022/0346125 A1     Oct. 27, 2022

Related U.S. Application Data

(60) Provisional application No. 63/180,299, filed on Apr. 27, 2021.

(51) Int. Cl.
*H04W 72/23*     (2023.01)
*H04L 1/1829*     (2023.01)
(Continued)

(52) U.S. Cl.
CPC .......... *H04W 72/23* (2023.01); *H04L 1/1854* (2013.01); *H04L 5/0053* (2013.01);
(Continued)

(58) Field of Classification Search
None
See application file for complete search history.

(56) References Cited

U.S. PATENT DOCUMENTS

| | | | |
|---|---|---|---|
| 2019/0268971 A1 | 8/2019 | Talarico |
| 2019/0342037 A1 | 11/2019 | Karaki |

(Continued)

FOREIGN PATENT DOCUMENTS

| | | |
|---|---|---|
| CN | 109075914 | 12/2018 |
| WO | 2020/033623 | 2/2020 |
| WO | 2021/075886 | 4/2021 |

OTHER PUBLICATIONS

Extended European Search Report for EP Patent Application No. 22169246.0; 13 pages; Aug. 10, 2022.

(Continued)

*Primary Examiner* — The Hy Nguyen

(74) *Attorney, Agent, or Firm* — Kowert, Hood, Munyon, Rankin & Goetzel, P.C.

(57) ABSTRACT

A base station (BS) and a user equipment (UE) establish a wireless link. The BS transmits first downlink control information (DCI) to the UE over an unlicensed spectrum during a first channel occupancy time (COT). The first DCI schedules a plurality of shared channel communications, which may be physical uplink shared channel (PUSCH) communications or physical downlink shared channel communication (PDSCH) communications. The first DCI also schedules an acknowledgment message for one or more of the plurality of shared channel communications. The scheduling indicated by the first DCI may include cross-COT scheduling, where one or more communications are scheduled in a second COT or outside of a COT. The UE and the BS perform the plurality of shared channel communications according to scheduling indicated by the first DCI.

20 Claims, 12 Drawing Sheets

(51) Int. Cl.
  *H04L 5/00*      (2006.01)
  *H04W 72/12*     (2023.01)
  *H04W 72/52*     (2023.01)
  *H04W 74/0816*   (2024.01)

(52) U.S. Cl.
  CPC ....... *H04W 72/1215* (2013.01); *H04W 72/52* (2023.01); *H04W 74/0816* (2013.01)

(56) References Cited

U.S. PATENT DOCUMENTS

| | | | |
|---|---|---|---|
| 2020/0313803 A1 | 10/2020 | Khoshnevisan et al. | |
| 2022/0007399 A1* | 1/2022 | Rastegardoost | H04L 5/0073 |
| 2022/0046708 A1* | 2/2022 | Sun | H04W 74/0816 |
| 2022/0210831 A1* | 6/2022 | Lin | H04W 72/23 |
| 2023/0023656 A1* | 1/2023 | Rastegardoost | H04W 72/0446 |
| 2024/0048291 A1* | 2/2024 | Fu | H04W 74/0816 |

OTHER PUBLICATIONS

Intel Corporation "Enhancements to HARQ for NR-unlicensed"; 3GPP TSG RAN WG1 Meeting #98 R1-1908626; Prague, CZ; 11 pages; Aug. 26-30, 2019.
Office Action for Japanese Pat. Application No. 2022-073127; Apr. 17, 2023.
CATT "Enhancements on Rel-17 SRS"; 3GPP TSG RAN WG1 #104b-e R1-2102630; Apr. 12, 2021.
OPPO "HARQ enhancements for NR-U"; 3GPP TSG RAN WG1 #96 R1-1901924; Feb. 1, 2019.
Ericsson "Session Notes 8.2 (Supporting NR from 52.6 GHz to 71 GHz)"; 3GPP TSG RAN WG1 #104b-e R1-2103980; Apr. 12, 2020.
Apple "URLLC uplink enhancements for unlicensed spectrum"; 3GPP TSG RAN WG1 #104bis-e R1-2103105; Apr. 12, 2021.
OPPP "Discussion on channel access mechanism"; 3GPP TSG RAN WG1 #104b-e R1-2102390; Apr. 12, 2021.
Office Action for CN No. 202210452559.2; Jan. 13, 2025.
Huawei et al. "DL channels and signals in NR unlicensed band", 3GPP TSG RAN WG1 Meeting #96bis R1-1903926, Apr. 8, 2019.
Office Action for KR 10-2022-0051977; Jan. 15, 2025.
VIVO "Discussion on HARQ operation for NR-U" 3GPP TSG RAN WG1 #99 R1-1912014; Nov. 18, 2019.
Qualcomm Inc. "Enhancements to Scheduling and HARQ operation for NR-U" 3GPP TSG RAN WG1 Meeting #97 R1-1907263; May 13, 2019.

\* cited by examiner

Rel-15 NR: Shared TB and time and frequency resource allocation

Rel-16 NR: Separate TB and time domain resource allocation for multi-TTI PUSCH transmission

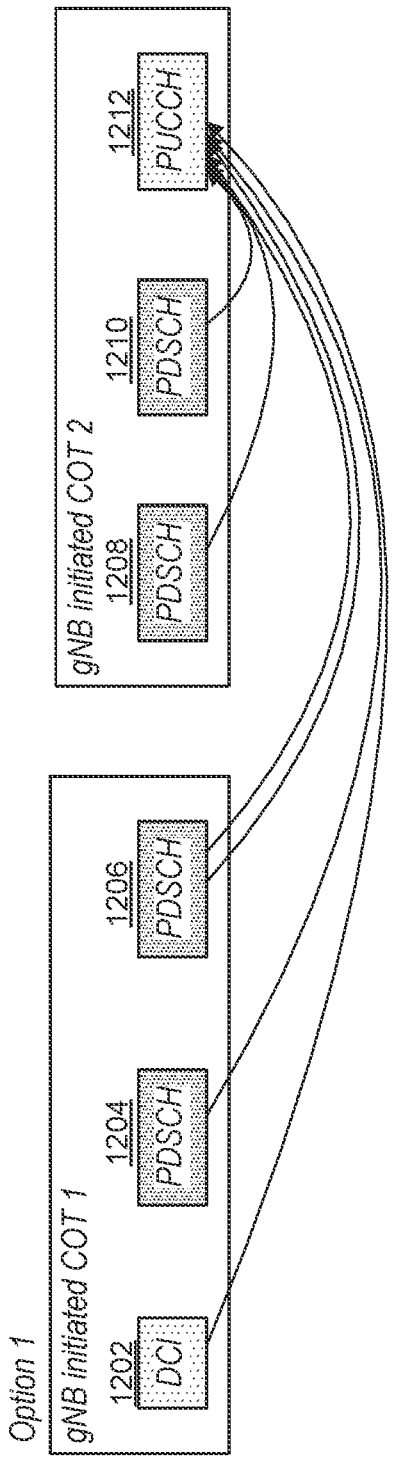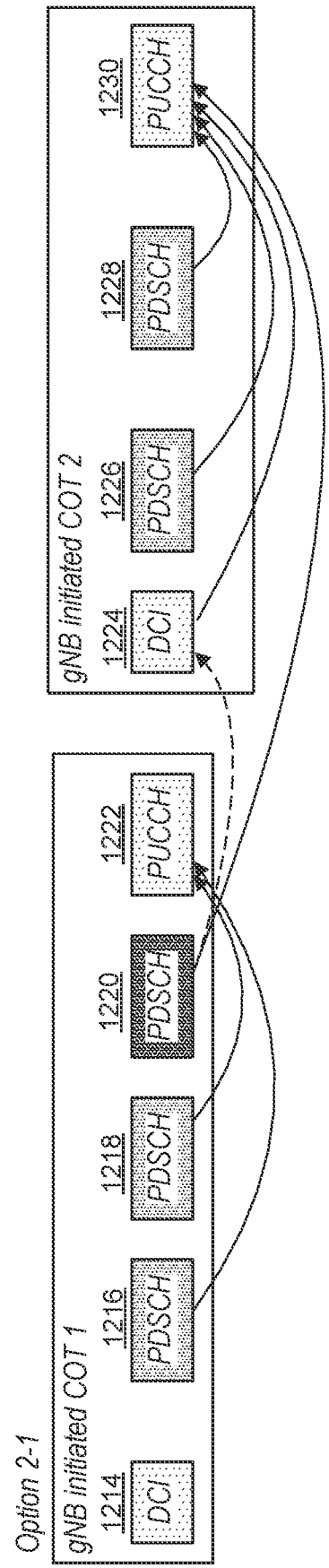
FIG. 12A
FIG. 12B

SYSTEMS AND METHODS FOR MULTI-PxSCH SCHEDULING IN UNLICENSED CHANNELS

PRIORITY INFORMATION

The present application claims priority to Provisional Patent Application No. 63/180,299, titled "Systems and Methods for Multi-PxSCH Scheduling in Unlicensed Channels" and filed on Apr. 27, 2021, which is hereby incorporated by reference in its entirety, as though completely and fully set forth herein.

FIELD

The present application relates to wireless communications, and more particularly to systems, apparatuses, and methods for scheduling multiple transmissions using a single downlink control transmission in unlicensed channels in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus, it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for scheduling multiple downlink transmissions using a single downlink control transmission in a wireless communication system.

In some embodiments, a base station (BS) establishes a wireless link with a user equipment (UE). The base station may be a g node B (gNB) and the wireless link may be a 5$^{th}$ Generation New Radio (5G NR) connection. The BS transmits first downlink control information (DCI) to the UE over an unlicensed spectrum during a first channel occupancy time (COT). The first DCI schedules a plurality of shared channel communications, which may be physical uplink shared channel (PUSCH) communications or physical downlink shared channel communication (PDSCH) communications. The first DCI may also schedule an acknowledgment message for one or more of the plurality of shared channel communications. The scheduling indicated by the first DCI may include cross-COT scheduling, where one or more communications are scheduled in a second COT separate from the first COT, or they may be scheduled outside of a COT. The UE and the BS perform the plurality of shared channel communications according to the scheduling indicated by the first DCI.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 12A-B illustrate different cross-COT scheduling methodologies for acknowledgment messaging, according to some embodiments;

Figure 1:
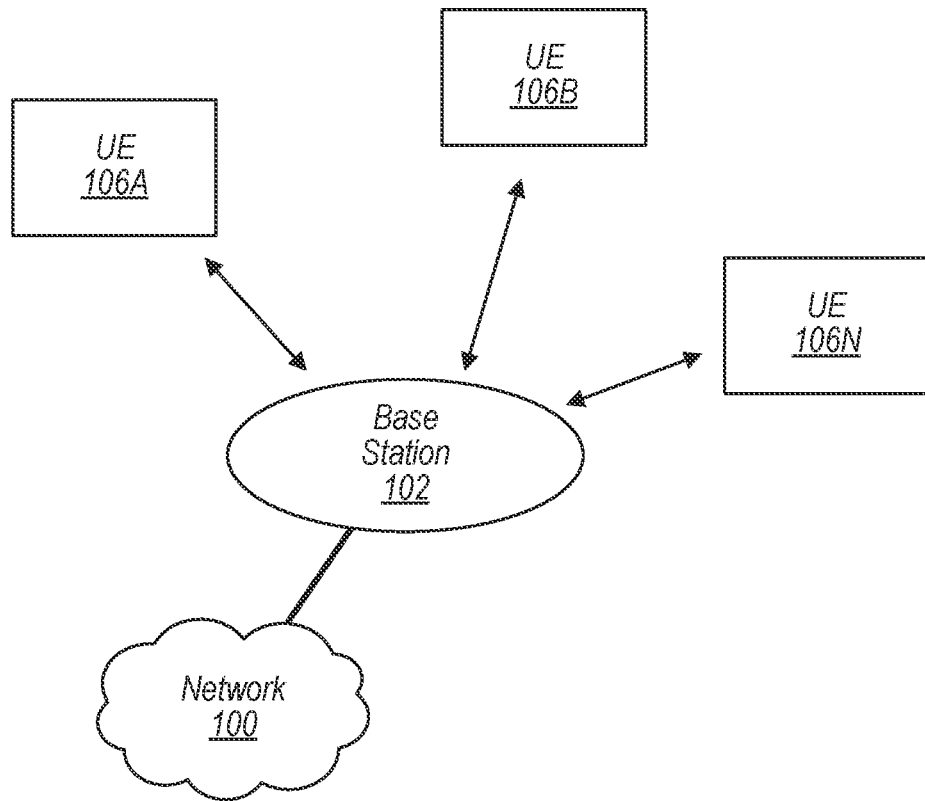
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
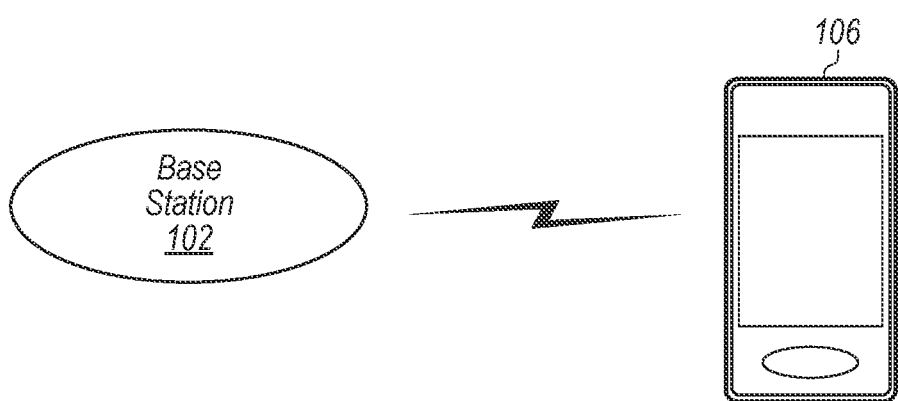
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for receiving multiple downlink transmissions that are scheduled using a single downlink control transmission in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
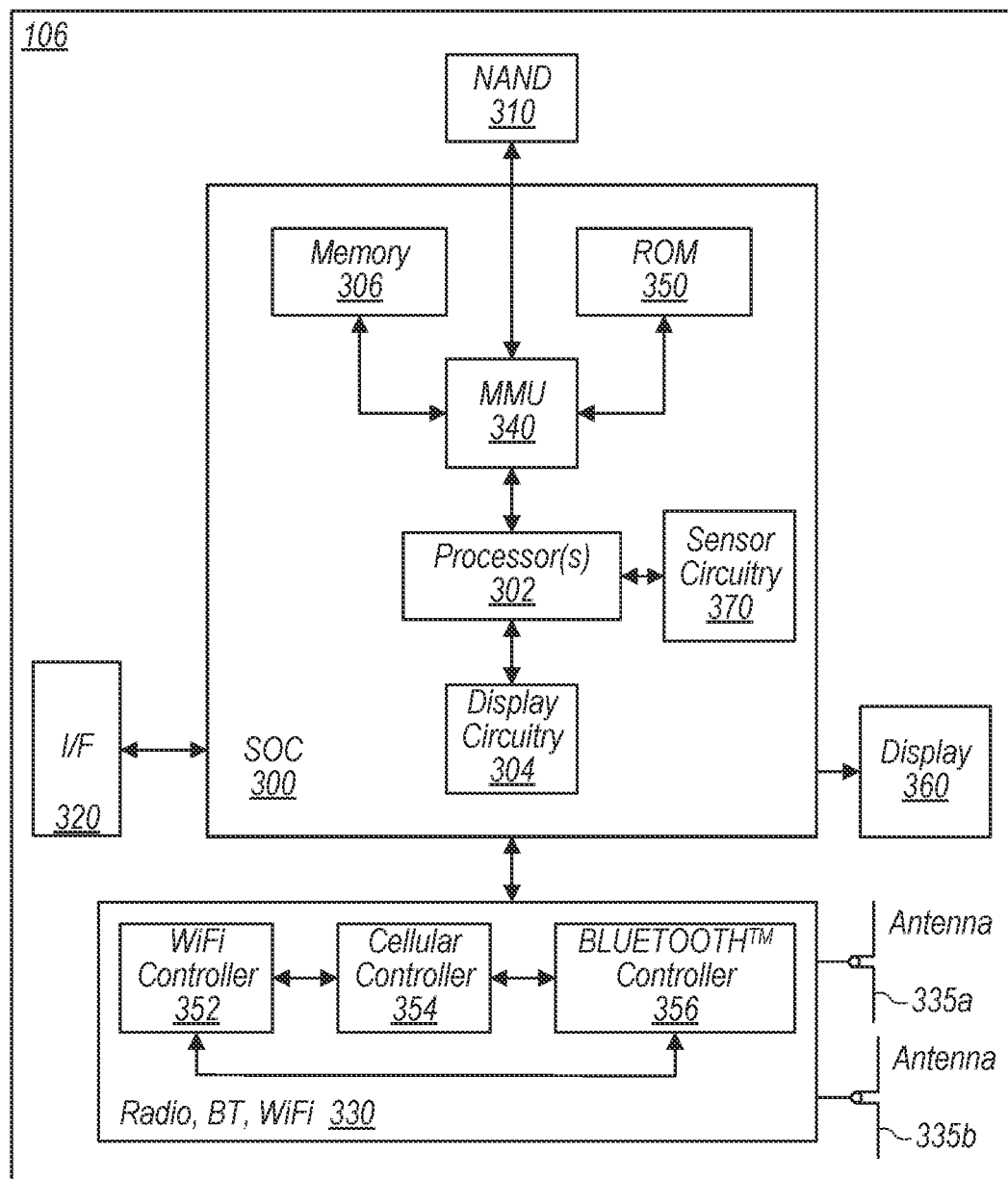
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for receiving multiple downlink transmissions scheduled using a single downlink control transmission in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for receiving multiple downlink transmissions scheduled using a single downlink control transmission in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
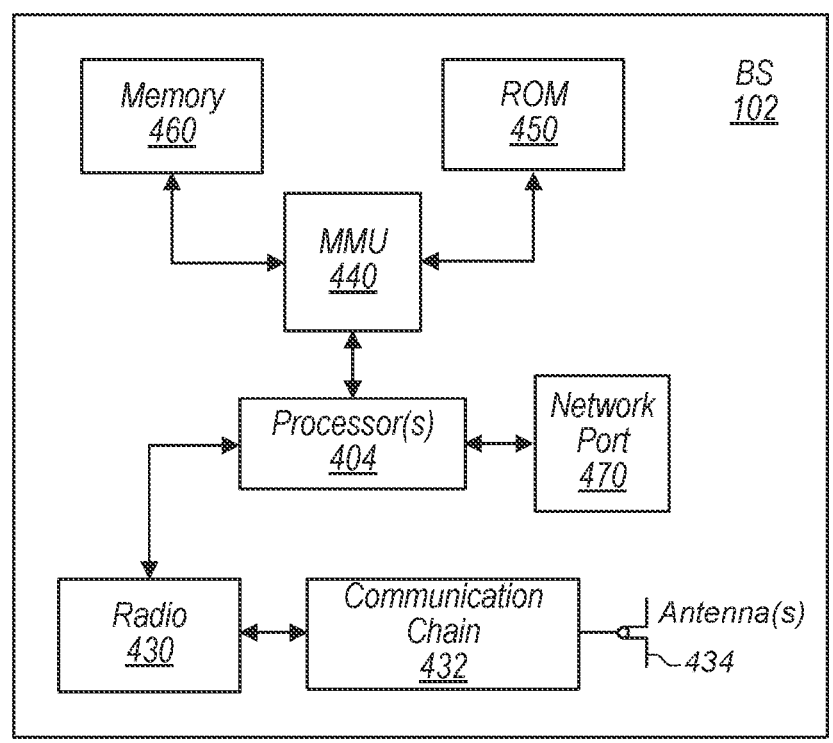
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, for example including scheduling multiple downlink transmissions using a single downlink control transmission, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Scheduling Multiple Transmissions Using a Single Downlink Control Transmission

According to cellular communication technologies, it may generally be possible for a cellular base station to communicate wirelessly with a wireless device. Such communication can be scheduled using downlink control information (DCI), which may be provided using control signaling such as on a physical downlink control channel (PDCCH) that may be transmitted in one or more control resource sets (CORESETs). A single DCI transmission may schedule a wireless device to receive information via a single instance (e.g., slot) of a downlink shared channel (e.g., a physical downlink shared channel (PDSCH)), and/or to transmit information via a single instance of an uplink shared channel (e.g., a physical uplink shared channel (PUSCH)). Alternatively, according to the techniques described herein, it may be possible for a single DCI transmission to schedule a wireless device to receive information during multiple downlink shared channel instances and/or transmit information during multiple uplink shared channel instances. Such techniques may have the potential to reduce wireless device power consumption and/or improve network resource utilization, among various possibilities. Such techniques may require and/or benefit from a variety of supporting techniques to enable effective network and wireless device operation, at least according to some embodiments. Numerous such techniques are also described herein.

Utilizing a single DCI transmission to schedule multiple uplink and/or downlink transmissions is referred to herein as multi-PDSCH/PUSCH scheduling. In some embodiments, the UL/DL transmissions and/or acknowledgment (ACK) messaging for the UL/DL transmissions scheduled by a DCI may extend beyond a current channel occupancy time (COT). For example, the DCI may be transmitted during a first base station (BS)-initiated COT, but it may schedule PDSCH/PUSCH transmissions and/or ACK messaging outside of the first COT (e.g., within a separate BS-initiated COT, within a UE-initiated COT, or outside of a COT). To accommodate these scenarios, embodiments herein describe various formats and methods for DCI transmission to effectively schedule PDSCH/PUSCH transmissions and/or ACK messaging in intra-COT communication scenarios.

A channel occupancy time (COT) may be established between a BS and a UE according to various methods. For example, a BS may negotiate with a UE and/or with the core network to reserve a period of time as a COT for communications between the UE and the BS, resulting in a BS-initiated COT. Alternatively, the UE may initiate negotiations to establish a UE-initiated COT between the UE and the BS. The device that is establishing the COT (i.e., the BS or the UE) may perform a Listen-before-talk (LBT) procedure to see if the channel is clear (e.g, by performing channel measurements). If the channel is clear, it may occupy the channel for the duration of the COT. The LBT procedure is a mechanism by which a device may apply a clear channel assessment (CCA) check (i.e., it may apply spectrum sensing for a certain period, called the CCA period) before using the channel. Certain rules may be implemented after determining that channel is busy. CCA may use Energy Detection (ED) to detect the presence (i.e., when the channel is busy) or absence (i.e., when the channel is idle) of other signals on the channel. If the detected energy during an initial CCA period is lower than a certain threshold (the ED threshold), the device may access the channel for a period called the Channel Occupancy Time (COT). Otherwise, an extended CCA period may start, in which the detected energy is again compared against the ED threshold until channel access is granted. LBT may be a legally mandatory procedure in some regions (e.g., Europe and Japan) for the 5 GHz and 60 GHz bands but it is not mandatory in other regions like the USA and China.

During the COT, network resources such as particular bandwidths may be reserved by the network in a particular region for communications between the BS and the UE. Upon expiration of the COT, it may be incumbent on the BS or the UE to re-initiate a second COT, or communications may occur between the BS and the UE outside of a COT.

In some regions (e.g., Europe and Japan), a Maximum Channel Occupancy Time (MCOT) may be implemented that prohibits continuous transmission in the unlicensed spectrum and impose limits on the COT. In these regions, the MCOT may specify the maximum continuous time a device may use the channel. The MCOT in different frequency bands (e.g., the 5 GHz and 60 GHz bands) may be limited to different durations (e.g., 2 ms, 4 ms, or up to 10 ms or another duration) depending on the channel access priority class and/or other factors.

Figure 5:
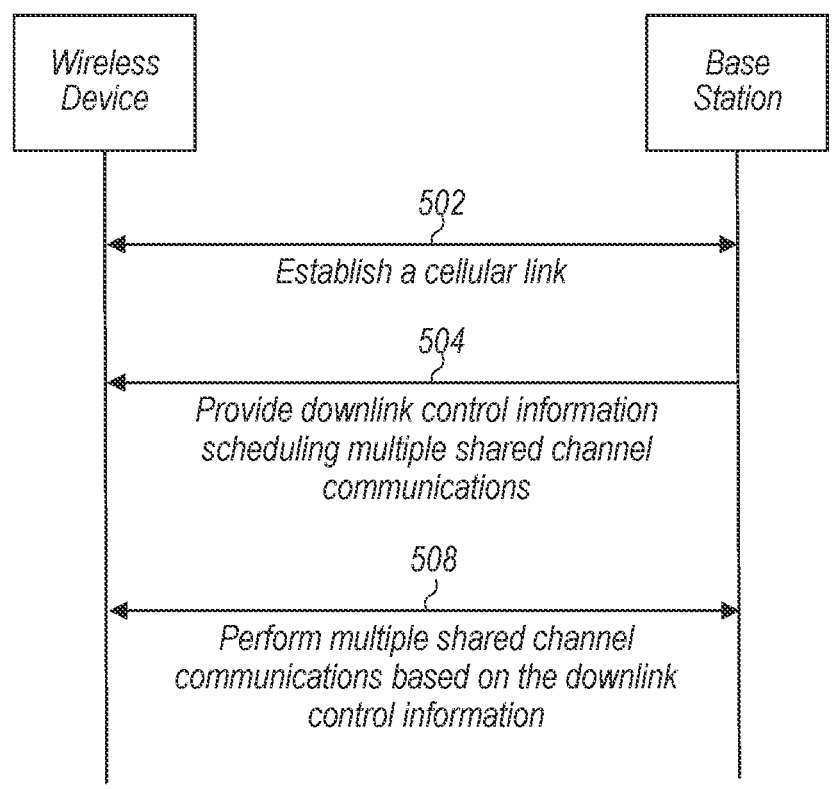
FIG. 5 is a flowchart diagram illustrating aspects of an exemplary possible method for scheduling multiple shared channel transmissions using a single downlink control transmission in a wireless communication system, according to some embodiments.

FIG. 5—Flowchart for Providing DCI for Multi-PDSCH/PUSCH Scheduling

FIG. 5 is a communication flow diagram illustrating a method for scheduling multiple downlink and/or uplink transmissions using a single downlink control transmission in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing an RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in an RRC connected state. In some instances, the RRC connection may also be released (e.g., after a certain period of inactivity with respect to data communication), in which case the wireless device may operate in an RRC idle state or an RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In some embodiments, establishing the wireless link(s) may include establishing a first channel occupancy time (COT). Establishing the first COT may be performed primarily by the wireless device and/or by the base station, to reserve a period of time and/or a set of network resources for communications between the wireless device and the base station. Establishing the first COT may be performed in an unlicensed frequency band, in some embodiments.

In 504, the wireless device may receive first downlink control information (DCI) from the base station scheduling a plurality of PDSCH/PUSCH communications and/or hybrid automatic repeat request (HARQ) acknowledgment/negative acknowledgment (ACK/NACK) messaging associated with the PDSCH/PUSCH communications. For example, the first DCI may schedule a plurality of downlink transmissions from the base station over the PDSCH, or it may schedule a plurality of uplink transmissions from the UE over the PUSCH. The first DCI may additionally schedule HARQ ACK/NACK messaging for the PDSCH transmissions over the PUCCH, or it may schedule HARQ ACK/NACK messaging for the PUSCH transmissions over the PDCCH.

The first DCI may be received via a control channel (e.g., a physical downlink control channel (PDCCH)), for example in a control resource set (CORESET) provided during a control channel monitoring opportunity (MO). In some embodiments, it may also be possible for the first DCI to be received via control signaling carried on a data or shared channel (e.g., a physical downlink shared channel (PDSCH)). For example, in some instances, it may be possible for a serving cell to provide "virtual DCI" (or V-DCI) in certain portions of PDSCH transmissions according to certain embodiments described herein, and the first DCI could be received in such a V-DCI transmission. The first DCI may be transmitted by the base station over an unlicensed spectrum during a first COT.

In some embodiments, the first DCI schedules the plurality of shared channel communications and at least one acknowledgment message for the plurality of shared channel communications within the first COT. In other words, each of the shared channel communications and the acknowledgment message(s) for the shared channel communications may be scheduled within a single COT. Alternatively, in some embodiments, the first DCI schedules the plurality of shared channel communications within the first COT and at least one acknowledgment message for the plurality of shared channel communications outside of the first COT. In these embodiments, the at least one acknowledgment message may be transmitted using contention exempt short control signaling or within a UE-initiated COT. For example, the acknowledgment message may be configured to be of a sufficiently short duration that it may be transmitted outside of a COT using contention exempt short control signaling. Alternatively, the UE may initiate a second COT and may transmit or receive the acknowledgment message for one or more of the shared channel communications during the second COT.

Figure 11A:
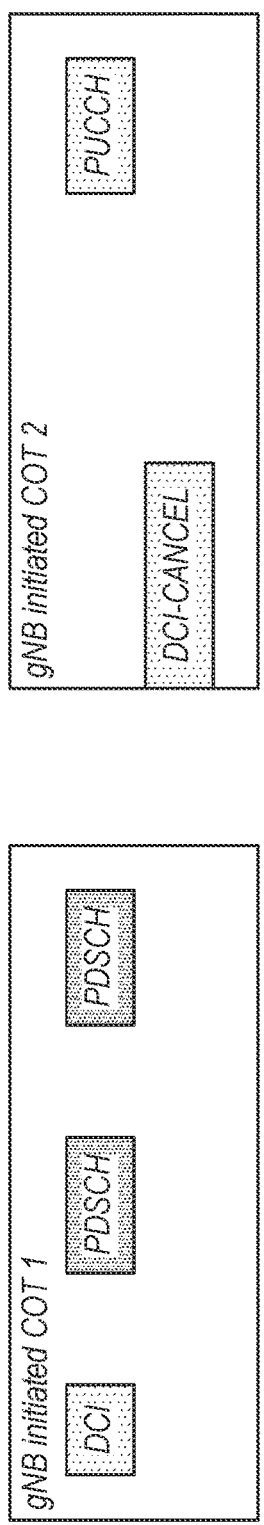
FIGS. 11A-C illustrate DCI scheduling scenarios where a PDSCH transmission falls outside of a gNB-initiated channel occupancy time (COT), according to some embodiments.
Figure 11B:
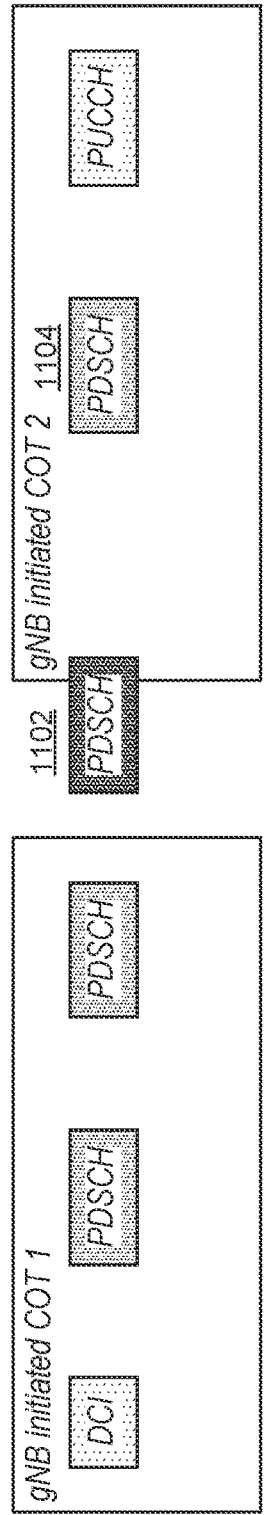
Figure 11C:
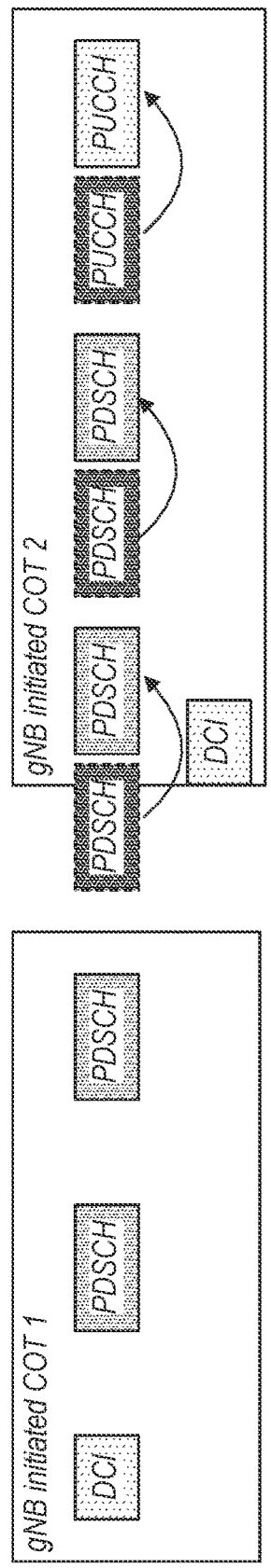

In some embodiments, the first DCI instructs the UE to shift the scheduling of at least a subset of the plurality of shared channel communications by an indicated amount, where the indicated amount shifts the at least the subset of the plurality of shared channel communications to occur within the second COT. The base station may instruct the UE to shift the shared channel communications in this manner responsive to a determination that one or more of the shared channel communications will occur outside the first COT, and the first DCI may serve to move these communications into a second COT, as shown in FIG. 11C. In some embodiments, the instruction to shift one or more shared channel communications may be indicated in second DCI transmitted during a second COT, or it may be indicated in the first DCI transmitted during the first COT. The second COT may have been initiated by the UE, as described above, or it may be a second COT that is initiated by the base station.

In some embodiments, the scheduling of the plurality of shared channel communications spans a plurality of COTs, and the first DCI further schedules acknowledgment messaging for each of the plurality of shared channel communications within a latest-occurring COT of the plurality of COTs. For example, as shown in FIG. 12A, the first DCI 1202 may schedule acknowledgment messaging for each of the four illustrated PDSCH communications 1204-1210 to occur within a single PUCCH 1212 opportunity during the second illustrated COT.

In some embodiments, the scheduling of the plurality of shared channel communications includes scheduling one or more first shared channel communications within the first COT and scheduling one or more second shared channel communications within a second COT. The first DCI may further schedule acknowledgment messaging for the first shared channel communications within the first COT and acknowledgment messaging for the second shared channel communications within the second COT. Alternatively, FIG. 12B shows an example where some of the PDSCH communications 1216 and 1218 that occur within the first COT have their corresponding acknowledgment messaging scheduled over the PUCCH 1222 in the first COT, but the third PDSCH communication 1220 occurs too close to the end of the COT for its acknowledgment message to occur during the first COT. Accordingly, the acknowledgment message for the PDSCH communication 1220, as well as the acknowledgment messages for the PDSCH communications 1226 and 1228 occurring in COT 2, are scheduled in the PUCCH 1230 during COT 2. The acknowledgment message for the PDSCH communication 1220 may be scheduled by the first DCI 1214, or alternatively, as illustrated by the dashed line, the second DCI 1224 may schedule this acknowledgment message during the PUCCH occasion 1230.

In some embodiments, the base station determines that values of a K0 parameter and a K1 parameter indicate cross-COT scheduling for a particular shared channel communication of the plurality of shared channel communications and an acknowledgment message for the particular shared channel communication. Responsive to this determination, the base station may modify the K1 parameter to a non-numerical K1 value. The base station may transmit second DCI to the UE over the unlicensed spectrum within a second COT, where the second DCI includes the non-numerical K1 value and schedules the acknowledgment message for the particular shared channel communication within the second COT. Alternatively, in some embodiments, the first DCI includes the non-numerical K1 value, which configures the UE to implement a default K1 value for the acknowledgment message for the particular shared channel communication in a second COT different from the first COT.

In some embodiments, the base station determines that the first COT has been interrupted. The first COT may be interrupted when a maximum COT duration has been reached, or when a maximum gap of the COT has been exceeded. Responsive to this determination, the base station may transmit a Type 3 hybrid automatic repeat request (HARQ) acknowledgment (ACK) feedback indication to the UE, where the Type 3 HARQ ACK feedback indication schedules all unreceived HARQ ACK messages associated with the plurality of shared channel communications. In other words, the Type 3 HARQ feedback indication may schedule every as-yet unperformed HARQ ACK message for the plurality of shared channel communications. Each of these HARQ ACK messages may be scheduled within a single PUCCH or PDCCH. For example, as shown in FIG. 13B, the PDSCH labeled 1302 has its acknowledgment message scheduled by the type 3 trigger 1304 and transmitted during the PUCCH 1306. Alternatively, in FIG. 13C each of the PDSCH communications 1308, 1310 and 1312 have their acknowledgment messages scheduled by the Type 3 trigger 1314 and transmitted during the PUCCH 1316.

In some embodiments, the first DCI further indicates a category for the UE to utilize when performing a listen-before-talk procedure when a maximum gap of the first COT has been exceeded without a transmission between the base station and the UE.

In 506, the wireless device and the base station may perform the shared channel communications and the acknowledgment messaging scheduled by the first DCI and/or the second DCI according to the scheduling. For example, as illustrated variously in FIGS. 10-14, the PDSCH communications and the PUCCH acknowledgment messages (or the PUSCH communications and the PDCCH acknowledgment messages) may be exchanged between the UE and the base station according to the scheduling indicated by the first and/or second DCI.

FIGS. 6-18—Additional Description

The following paragraphs provide additional detail and description of various embodiments.

Figure 6A:
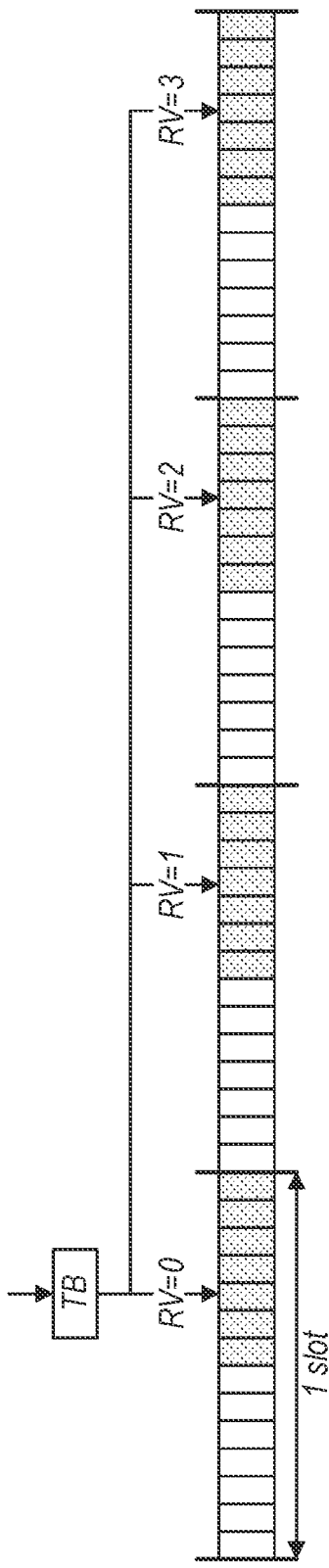
FIGS. 6A-B illustrate example resource allocations for uplink transmissions in 5G NR release 15 and 16, according to some embodiments.

Current cellular communication standards implement specific protocols for PUSCH/PDSCH transmissions. For example, NR Release 15 proscribes that the number of repetitions of PUSCH transmissions with slot aggregation is semi-statically configured. An example of PUSCH repetitions for Release 15 is shown in FIG. 6A, where a shared transport block (TB) is used to allocate time and frequency resources for PUSCH repetitions at regular intervals and for the same duration.

Figure 6B:
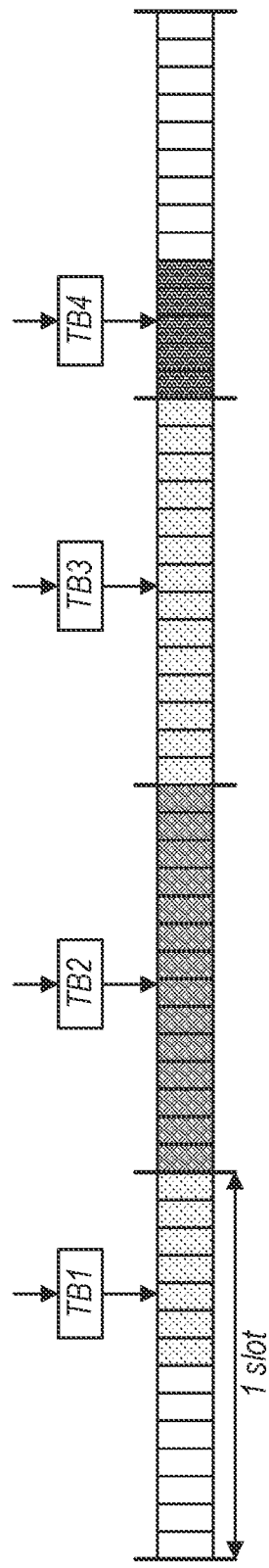
Figure 7:
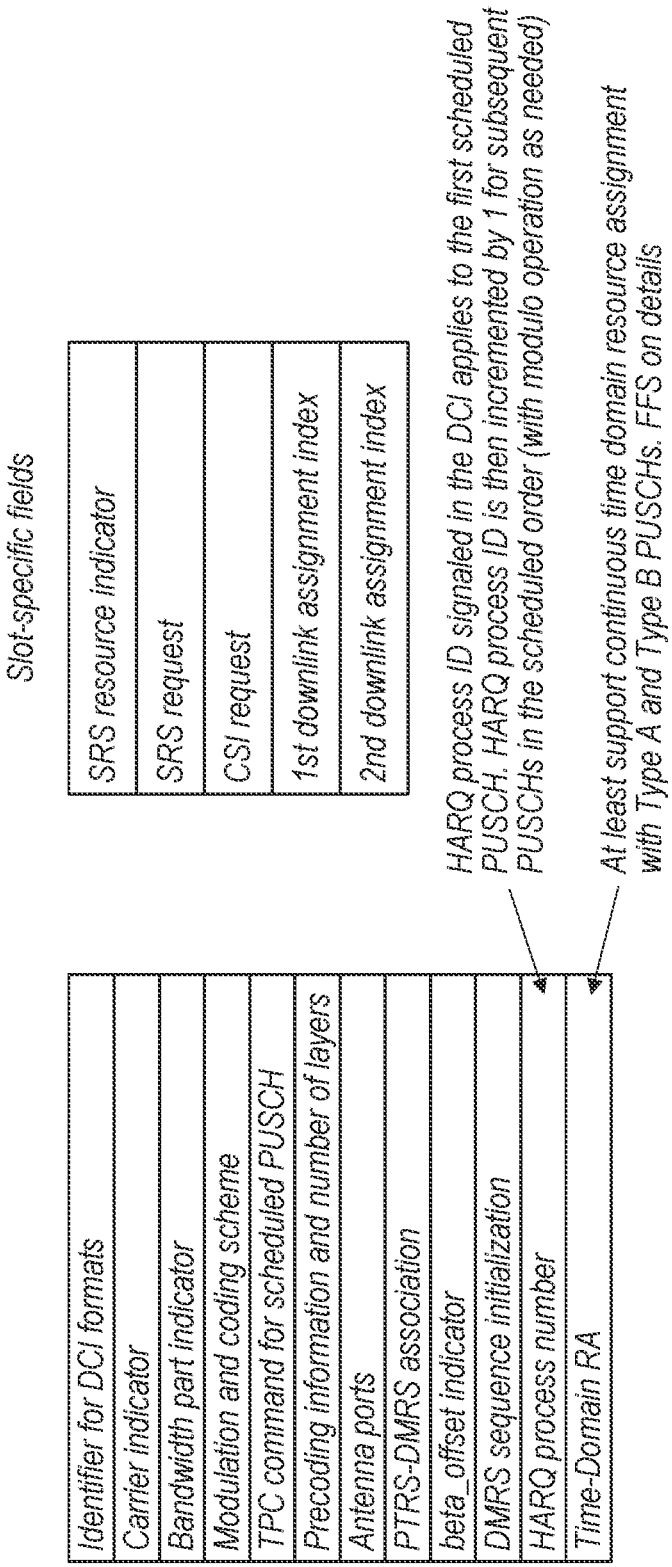
FIG. 7 illustrates an exemplary set of fields for downlink control information (DCI), according to some embodiments.

Alternatively, for NR Release 16, the number of repetitions of PUSCH transmissions for slot aggregation may be dynamically indicated by the network. PUSCH repetitions may be transmitted in one slot or across multiple consecutive slots, and may be supported for both dynamic grant and configured grant. FIG. 6B illustrates dynamic slot allocation for PUSCH repetitions, which shown separate TB and time domain resource allocation for a multi-transmission time interval (TTI) PUSCH transmission, where the timing and duration of PUSCH repetitions is dynamically indicated and varies from one repetition to the next. The DCI that is transmitted by the BS to schedule these dynamic PUSCH repetitions may have a set of fields similar to that shown in FIG. 7. As illustrated, the DCI may contain a number of common fields that are the same for each of the PUSCH repetitions, as well as several slot-specific fields that are unique for each PUSCH repetition. The slot-specific fields may include a HARQ process number and a time domain resource allocation (TDRA) field. The HARQ process number may identify which PUSCH repetition is being scheduled, and as described in FIG. 8, the TDRA field may specify scheduling parameters for each PUSCH repetition.

Figures 8, 9:
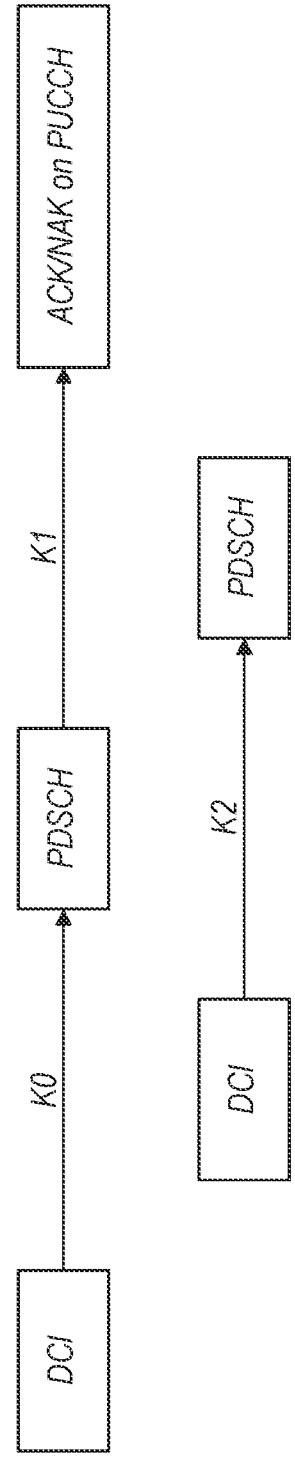
FIG. 8 illustrates a time domain resource allocation table and corresponding physical uplink shared channel (PUSCH) allocations, according to some embodiments.
FIG. 9 illustrates the roles played by K0, K1 and K2 parameters, according to some embodiments.

As shown in FIG. 8, the time domain resource allocation (TDRA) for dynamically scheduled PUSCH repetitions may be indicated using a table including a plurality of variables mapped to a TDRA index. The TDRA table may enable indication of single or multiple continuous PUSCH transmissions in a single slot or multiple slots. The BS may include the TDRA index within DCI transmitted to a UE, and the UE may have stored thereon a lookup table (such as the table shown in FIG. 8) to extract the transmission parameters of the PUSCH repetitions. As illustrated, the lookup table may specify values for a K2 parameter (indicating the slot number for each PUSCH transmission), S (indicating the starting symbol for each PUSCH transmission), L (the length of each PUSCH transmission), a number of repetitions, and a mapping type for each value of the TDRA index.

FIG. 9 illustrates the role played by the parameters K0, K1 and K2. As illustrated, the K0 parameter indicates the duration of time between transmission of the DCI and the PDSCH transmission scheduled by the DCI. The K1 parameter indicates the duration of time between the PDSCH transmission and transmission of the hybrid automatic repeat request (HARQ) acknowledgment/negative acknowledgment (ACK/NACK) message on the PUCCH for the PDSCH transmission. The K2 parameter indicates the duration of time between transmission of the DCI and the PUSCH transmission scheduled by the DCI.

Examples of PDSCH and PUCCH Transmission Scheduling

FIGS. 10-14 illustrate various examples of scheduling of shared channel communications and their associated acknowledgment messaging, according to various embodiments. The examples shown in FIGS. 10-14 describe embodiments where the shared channel communications occur over the downlink through the PDSCH, whereas the acknowledgment messaging occurs in the uplink through the PUCCH. However, it is within the scope of the present disclosure that the inverse situation may also occur, i.e., that the DCI schedules shared channel communications in the uplink through the PUSCH, whereas the acknowledgment messaging occurs in the downlink through the PDCCH.

Figure 10A:
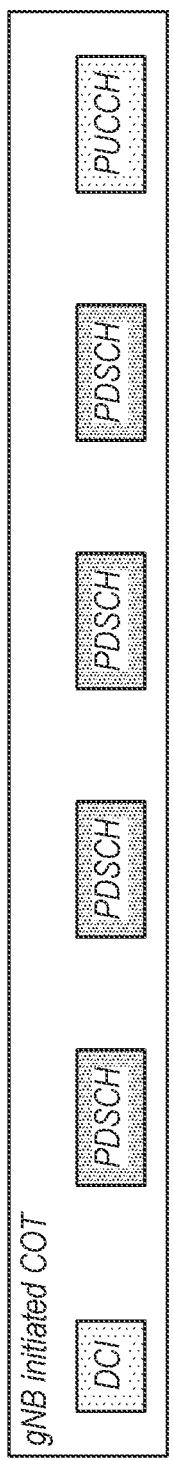
FIGS. 10A-D illustrate different scheduling options for physical downlink shared channel (PDSCH) communications and corresponding acknowledgment messaging, according to some embodiments.

In some Multi-PDSCH/PUSCH instances, the PDSCH/PUSCH transmissions as well as the corresponding HARQ ACK messaging may occur entirely within a single COT, as shown in FIG. 10A. In these instances, DCI scheduling for unlicensed communications may operate similarly to licensed access, where the DCI schedules the PDSCH/PUSCH transmissions and the HARQ ACK messaging within the COT.

Figure 10B:
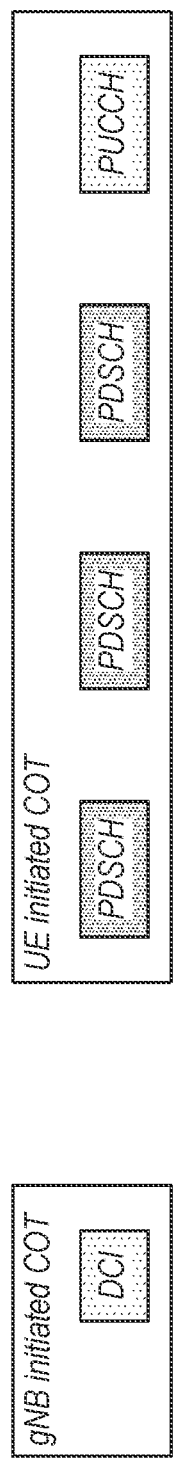
Figure 10C:
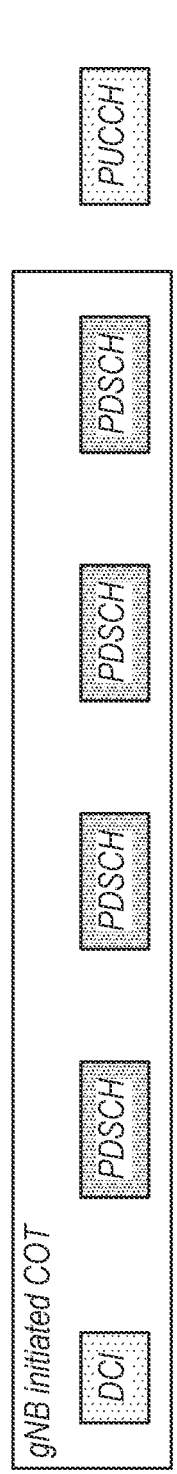
Figure 10D:
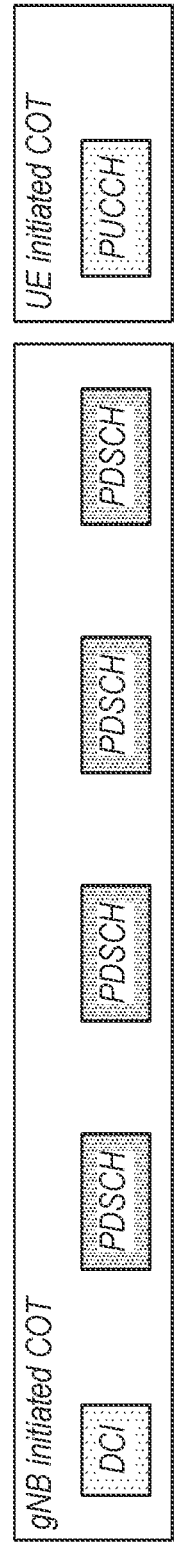

However, in some instances, the PDSCH/PUSCH transmission may occur within a single COT but HARQ ACK messaging may occur outside of the COT (e.g., if there is insufficient remaining time within the COT to perform both the PDSCH/PUSCH transmission and the HARQ ACK messaging). In other words, one or both of PDSCH/PUSCH transmissions and HARQ ACK messaging may be scheduled at times where there is no BS/UE access due to failure of the BS or the UE to obtain a valid COT. In these instances, the HARQ ACK messaging may be performed a) outside the COT using contention exempt short control signaling as shown in FIG. 10C, or b) within a separate UE-initiated COT as shown in FIGS. 10B and 10D, in various embodiments.

Contention exempt short control signaling may be utilized in some deployments when the HARQ ACK messaging is of sufficiently short duration to be performed as a stand-alone transmission without establishing a separate COT. In some embodiments, a threshold may be established for the size of the HARQ ACK messaging to be sent over the control channel (i.e, the PDCHH or the PUCCH) to allow for transmission over contention exempt short control signaling. Alternatively, the UE may compete to establish a UE-initiated COT and send the entire multi-PUSCH transmission within the UE-initiated COT. If the UE fails to establish the COT, the entire transmission may be cancelled.

In some instances, as shown in FIGS. 11-14, the PUSCH/PDSCH transmissions may span too long of a time to be performed within a single COT, and they may occur across multiple COTs. In these embodiments, cross-COT multi-PDSCH/PUSCH scheduling may be employed to schedule the PDSCH/PUSCH transmissions. If the transmission time interval (TTI) for a particular PDSCH/PUSCH transmission occurs outside of a COT such that the UE is in a listen-before-talk (LBT) scenario, the transmission may not be transmitted (for DL) or received (for UL). The UE may continue transmission and/or reception as specified in the sequence scheduled by the DCI unless it receives an override from the BS indicating that it should cancel the entire transmission. As shown in FIG. 11A, the BS may transmit a second DCI instructing the UE to cancel subsequent transmissions or receptions scheduled by the first DCI. Alternatively, as shown in FIG. 11B, the PDSCH transmission 1102 may be scheduled outside of COT 1 and COT 2 (and may not be successfully received), whereas a subsequent PDSCH transmission 1104 is successfully performed within a second COT.

Alternatively, as shown in FIG. 11C, the BS may indicate in the first DCI the start time of the COT and a required time shift to the transmissions to fit within new COT. The UE may use the shift to identify the positions of the new transmissions. (e.g. the BS may use DCI 2-0 to indicate the shift). Alternatively, the BS may send a second DCI to indicate the required shift.

In some embodiments, as shown in FIG. 12A, when the PUSCH/PDSCH transmissions occur across multiple COTs, the DCI may instruct the UE to postpone all HARQ ACK transmissions to the last COT of the multiple COTs. In other words, the plurality of PDSCH/PUSCH TTIs may be assigned to a single cross-COT HARQ ACK feedback PDSCH group, which is indicated and scheduled in the first DCI.

Figure 13A:
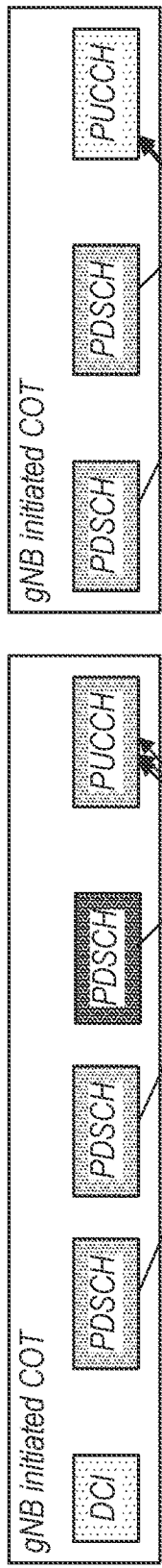
FIGS. 13A-C illustrate acknowledgment messaging scheduling methodologies including a type 3 trigger, according to some embodiments.
Figure 13B:
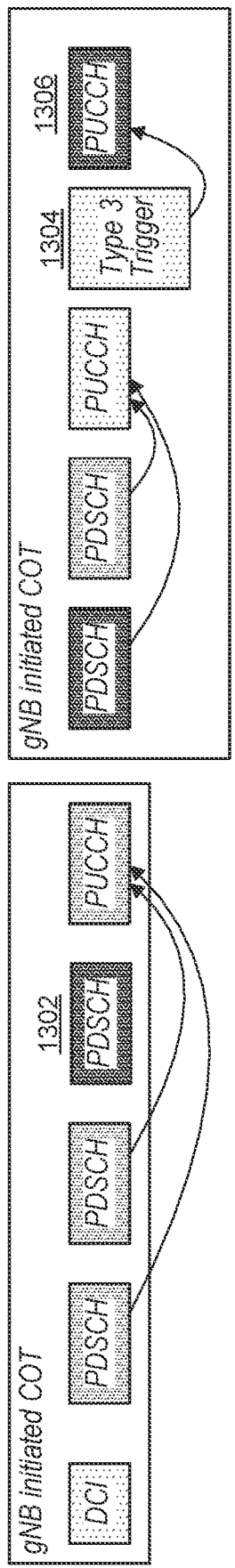
Figure 13C:
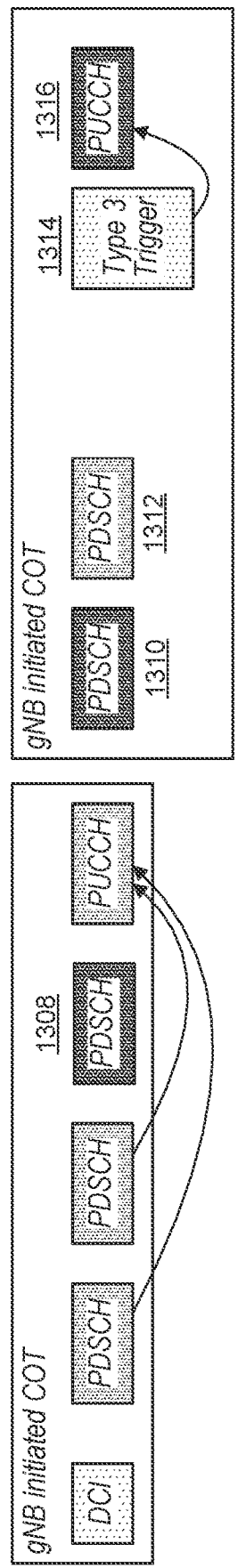

Alternatively, as shown in FIG. 13A, each PDSCH/PUSCH may have its associated HARQ ACK messaging scheduled within the same COT as the PDSCH/PUSCH transmission, i.e., HARQ ACK feedback may be scheduled per COT without cross-COT HARQ feedback. The PDSCH/PUSCH transmissions may be divided into two or more groups, and each group may share a single HARQ ACK feedback slot for providing feedback within a respective COT. Alternatively, the timing for each HARQ ACK transmission may be determined individually based on their values of K0 and K1. In the case that the K0 and K1 values result in cross-COT HARQ transmission, the UE may modify its K1 value to a non-numerical K1 (NNK1) value (e.g., it may be set to infinity) to postpone the HARQ ACK feedback until a next valid COT opportunity, as shown in FIG. 12B.

In some embodiments, if a COT is interrupted, the UE may receive a Type 3 HARQ ACK feedback indication to reschedule HARQ ACK feedback. The first COT may be interrupted when a maximum COT duration has been reached, or when a maximum gap of the COT has been exceeded. The Type 3 HARQ ACK feedback indication is a single transmission that may be used to schedule either all the HARQ ACK transmissions or all the postponed HARQ ACK transmissions.

In some embodiments, different categories of LBT access may be utilized by the UE, depending on an indication within the DCI received from the network. For example, some deployments utilize category 1 (CAT1), where the UE has immediate channel access, category 2 (CAT2), where the UE performs a clear channel assessment with a fixed measurement duration before conducting communications, and category 4 (CAT4), where the UE performs clear channel assessment with a variable measurement duration before conducting communications. The DCI received from the BS may indicate which category to use for LBT.

Figure 14A:
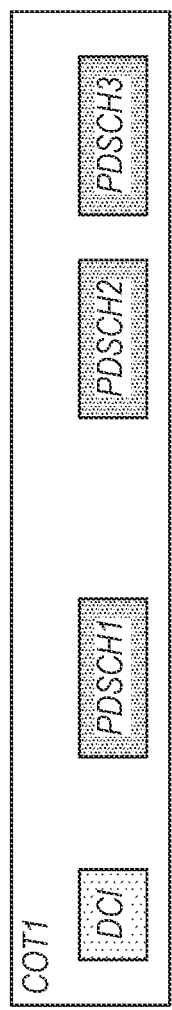
FIGS. 14A and 14B illustrate a COT without and with a maximum gap duration, respectively, according to some embodiments.
Figure 14B:
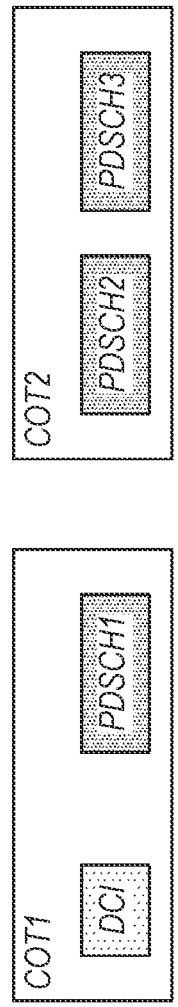

In some deployments, a maximum gap may be defined for a deployed COT, where the COT will be cancelled if a transmission does not occur between the UE and the BS for a duration of time that exceeds the maximum gap. When the first COT is cancelled, the UE may perform LBT to resume cellular access. On the other hand, a later transmission may share a single COT with a previous transmission without performing LBT if the later transmission starts within the maximum gap from the end of the earlier transmission. FIG. 14B shows an example where the maximum gap has been exceeded and a second COT is established, whereas FIG. 14A illustrates a deployment without a maximum gap.

If the gap between any two transmissions is smaller than the maximum gap, then the BS and the UE may communicate using CAT1 channel access. However, the maximum gap is exceeded, the UE may need to reestablish communications within a second COT. In some embodiments, first DCI received from the BS in the first COT may specify the LBT category to utilize when establishing a connection in the second COT. For example, the first DCI may indicate that a single category (e.g., CAT1) should be used for the first COT and each subsequent COT. Alternatively, the first DCI may separately specify a parameter to indicate a category for LBT for each COT (e.g., CAT1 LBT for COT1, CAT2 LBT for COT2, etc., among other possibilities). Alternatively, the UE may default to using a particular category (e.g., CAT1) for obtaining channel access if a COT is interrupted.

The following numbered paragraphs describe additional embodiments.

In some embodiments, a user equipment (UE) establishes a wireless link with a cellular base station, receives first downlink control information (DCI) from the cellular base station over an unlicensed spectrum during a first channel occupancy time (COT), where the first DCI schedules a plurality of shared channel communications, and performs the plurality of shared channel communications according to the first DCI.

In some embodiments, the first DCI schedules the plurality of shared channel communications and at least one acknowledgment message for the plurality of shared channel communications within the first COT.

In some embodiments, the first DCI schedules the plurality of shared channel communications within the first COT, and the first DCI schedules at least one acknowledgment message for the plurality of shared channel communications outside of the first COT.

In some embodiments, the at least one acknowledgment message is transmitted using contention exempt short control signaling, or within a UE-initiated COT.

In some embodiments, the UE receives second DCI from the base station over the unlicensed spectrum during a second COT, where the second DCI instructs the UE to shift the scheduling of at least a subset of the plurality of shared channel communications by an indicated amount, and where the indicated amount shifts the at least the subset of the plurality of shared channel communications into the second COT.

In some embodiments, the scheduling of the plurality of shared channel communications spans a plurality of COTs, and the first DCI further schedules acknowledgment messaging for each of the plurality of shared channel communications within a latest COT of the plurality of COTs.

In some embodiments, the scheduling of the plurality of shared channel communications comprises scheduling one or more first shared channel communications within the first COT and scheduling one or more second shared channel communications within a second COT, and the first DCI further schedules acknowledgment messaging for the first shared channel communications within the first COT and acknowledgment messaging for the second shared channel communications within the second COT.

In some embodiments, the first DCI further indicates a category for the UE to utilize when performing a listen-before-talk procedure when a maximum gap of the first COT has been exceeded without a transmission between the base station and the UE.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a base station to:
establish a wireless link with a user equipment (UE);
transmit first downlink control information (DCI) to the UE over an unlicensed spectrum during a first channel occupancy time (COT), wherein the first DCI schedules a plurality of shared channel communications;
perform the plurality of shared channel communications according to the first DCI; and
transmit second DCI to the UE over the unlicensed spectrum during a second COT, wherein the second DCI instructs the UE to shift the scheduling of at least a subset of the plurality of shared channel communications by an indicated amount, wherein the indicated amount shifts the at least the subset of the plurality of shared channel communications from outside the first COT and into the second COT.

2. The apparatus of claim 1,
wherein the plurality of shared channel communications comprises one or both of:
physical downlink shared channel (PDSCH) communications; and
physical uplink shared channel (PUSCH) communications.

3. The apparatus of claim 1,
wherein the first DCI schedules the plurality of shared channel communications and at least one acknowledgment message for the plurality of shared channel communications within the first COT.

4. The apparatus of claim 1,
wherein the first DCI schedules the plurality of shared channel communications within the first COT, and
wherein the first DCI schedules at least one acknowledgment message for the plurality of shared channel communications outside of the first COT.

5. The apparatus of claim 4,
wherein the at least one acknowledgment message is transmitted:
using contention exempt short control signaling; or
within a UE-initiated COT.

6. The apparatus of claim 1,
wherein the scheduling of the plurality of shared channel communications spans a plurality of COTs, and
wherein the first DCI further schedules acknowledgment messaging for each of the plurality of shared channel communications within a latest COT of the plurality of COTs.

7. The apparatus of claim 1,
wherein the scheduling of the plurality of shared channel communications comprises scheduling one or more first shared channel communications within the first COT, wherein the first DCI schedules acknowledgment messaging for the first shared channel communications within the first COT, and wherein the processor is further configured to cause the base station to:
wherein the second DCI schedules one or more second shared channel communications within the second COT, wherein the second DCI further schedules acknowledgment messaging for the second shared channel communications within the second COT.

8. The apparatus of claim 7,
wherein the processor is further configured to cause the base station to:
   determine that values of a K0 parameter and a K1 parameter indicate cross-COT scheduling for a third shared channel communication of the plurality of shared channel communications and an acknowledgment message for the third shared channel communication; and
   responsive to determining that the values of the K0 parameter and the K1 parameter indicate the cross-COT scheduling, schedule acknowledgment messaging for the third shared channel communication in the second COT using the second DCI.

9. The apparatus of claim 7,
wherein the processor is further configured to cause the base station to:
   determine that values of a K0 parameter and a K1 parameter indicate cross-COT scheduling for a third shared channel communication of the plurality of shared channel communications and an acknowledgment message for the third shared channel communication; and
   responsive to determining that the values of the K0 parameter and the K1 parameter indicate the cross-COT scheduling, modify the K1 parameter to a non-numerical K1 value, wherein the first DCI comprises the non-numerical K1 value, and wherein the non-numerical K1 value configures the UE to implement a default K1 value for the acknowledgment message for the third shared channel communication in the second COT, wherein the second COT is different from the first COT.

10. The apparatus of claim 1,
wherein the processor is further configured to cause the base station to:
   determine that the first COT has been interrupted; and
   responsive to determining that the first COT has been interrupted, transmit a Type 3 hybrid automatic repeat request (HARQ) acknowledgment (ACK) feedback indication to the UE, wherein the Type 3 HARQ ACK feedback indication schedules all unreceived HARQ ACK messages associated with the plurality of shared channel communications.

11. The apparatus of claim 1,
wherein the first DCI further indicates a category for the UE to utilize when performing a listen-before-talk procedure when a maximum gap of the first COT has been exceeded without a transmission between the base station and the UE.

12. An apparatus, comprising:
a processor configured to cause a user equipment (UE) to:
   establish a wireless link with a cellular base station;
   receive first downlink control information (DCI) from the cellular base station over an unlicensed spectrum during a first channel occupancy time (COT), wherein the first DCI schedules a plurality of shared channel communications;
   perform the plurality of shared channel communications according to the first DCI; and
   receive second DCI from the cellular base station over the unlicensed spectrum during a second COT, wherein the second DCI instructs the UE to shift the scheduling of at least a subset of the plurality of shared channel communications by an indicated amount, wherein the indicated amount shifts the at least the subset of the plurality of shared channel communications from outside the first COT and into the second COT.

13. The apparatus of claim 12,
wherein the first DCI schedules the plurality of shared channel communications and at least one acknowledgment message for the plurality of shared channel communications within the first COT.

14. The apparatus of claim 12,
wherein the first DCI schedules the plurality of shared channel communications within the first COT, and
wherein the first DCI schedules at least one acknowledgment message for the plurality of shared channel communications outside of the first COT, and
wherein the at least one acknowledgment message is transmitted:
   using contention exempt short control signaling; or
   within a UE-initiated COT.

15. The apparatus of claim 12,
wherein the scheduling of the plurality of shared channel communications spans a plurality of COTs, and
wherein the first DCI further schedules acknowledgment messaging for each of the plurality of shared channel communications within a latest COT of the plurality of COTs.

16. The apparatus of claim 12,
wherein the scheduling of the plurality of shared channel communications comprises scheduling one or more first shared channel communications within the first COT and scheduling one or more second shared channel communications within the second COT, and
wherein the first DCI further schedules acknowledgment messaging for the first shared channel communications within the first COT and acknowledgment messaging for the second shared channel communications within the second COT.

17. The apparatus of claim 12,
wherein the first DCI further indicates a category for the UE to utilize when performing a listen-before-talk procedure when a maximum gap of the first COT has been exceeded without a transmission between the base station and the UE.

18. A method, comprising:
by a user equipment (UE):
   establishing a wireless link with a cellular base station;
   receiving first downlink control information (DCI) from the cellular base station over an unlicensed spectrum during a first channel occupancy time (COT), wherein the first DCI schedules a plurality of shared channel communications; and
   performing the plurality of shared channel communications according to the first DCI; and
   receiving second DCI from the cellular base station over the unlicensed spectrum during a second COT, wherein the second DCI instructs the UE to shift the scheduling of at least a subset of the plurality of shared channel communications by an indicated amount, wherein the indicated amount shifts the at least the subset of the plurality of shared channel communications from outside the first COT and into the second COT.

19. The method of claim 18,
wherein the first DCI schedules the plurality of shared channel communications and at least one acknowledgment message for the plurality of shared channel communications within the first COT.

20. The method of claim 18,
wherein the first DCI schedules the plurality of shared channel communications within the first COT, and
wherein the first DCI schedules at least one acknowledgment message for the plurality of shared channel communications outside of the first COT, and
wherein the at least one acknowledgment message is transmitted:
  using contention exempt short control signaling; or
  within a UE-initiated COT.

* * * * *